United States Patent
Lim

(10) Patent No.: US 7,219,243 B2
(45) Date of Patent: May 15, 2007

(54) HOME NETWORK POWER SAVING DEVICE AND METHOD FOR THE SAME

(75) Inventor: Hyung Taek Lim, Kyungki-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/515,296

(22) PCT Filed: Jun. 26, 2002

(86) PCT No.: PCT/KR02/01220

§ 371 (c)(1),
(2), (4) Date: Jun. 25, 2005

(65) Prior Publication Data

US 2006/0155395 A1   Jul. 13, 2006

(51) Int. Cl.
*G06F 1/26* (2006.01)
(52) U.S. Cl. ............. 713/320; 713/300; 713/310; 713/321; 713/322; 713/323; 713/324; 713/330; 713/340
(58) Field of Classification Search ........... 713/300, 713/310, 320–324, 330, 340; 363/20, 21
See application file for complete search history.

(56) References Cited

U.S. PATENT DOCUMENTS

| | | |
|---|---|---|
| 5,251,856 A | 10/1993 | Young et al. |
| 5,477,279 A | 12/1995 | Chang |
| 5,752,044 A | 5/1998 | Crump et al. |
| 6,108,217 A * | 8/2000 | Tran ............................. 363/20 |
| 6,333,862 B1 * | 12/2001 | Lee et al. ................ 363/21.01 |

FOREIGN PATENT DOCUMENTS

JP   2001-54176   2/2001

* cited by examiner

*Primary Examiner*—A. Elamin
(74) *Attorney, Agent, or Firm*—Birch, Stewart, Kolasch & Birch, LLP

(57) ABSTRACT

A home network system with a standby power saving function and a method for saving standby power thereof, wherein various home appliances exchange information with a home server from time to time. At least one home appliance for a home network is provided in the home network system to exchange information with the home server over a network line. The home appliance includes a controller for analyzing data received over the network line and generating and outputting a home appliance control signal in accordance with the analyzed result, a load for operating/stopping the home appliance in response to the home appliance control signal from the controller, a low voltage transformer (LVT) for receiving an external voltage and supplying a drive voltage to the controller to operate the load and controller, and an LVT relay and a power supply unit for cooperating to selectively supply the drive voltage and a standby voltage to the controller according to whether the home appliance is in operation. When the home appliance is in a standby mode, the supply of external power is interrupted and only the minimum power necessary for the controller is supplied, thereby making it possible to save the same amount of standby power as that of LVT leakage power.

18 Claims, 4 Drawing Sheets

HOME NETWORK POWER SAVING DEVICE AND METHOD FOR THE SAME

FIELD OF THE INVENTION

The present invention relates to a home network system with a standby power saving function and a method for saving standby power thereof, and more particularly to a home network system with a standby power saving function and a method for saving standby power thereof, wherein various home appliances exchange information with a home server from time to time and, in a power standby mode, the supply of power to each of the home appliances is interrupted with the exception of a minimum amount of power necessary for a controller therein.

BACKGROUND ART

FIG. 1 is a block diagram showing the construction of a conventional home network system, and FIG. 2 is a block diagram showing the construction of each home appliance provided in the conventional home network system.

As shown in FIGS. 1 and 2, the conventional home network system comprises a plurality of home appliances 2 and 3 connected to a power line 1, which supplies operating power, and a home server 5 for exchanging information with the home appliances 2 and 3 over a network line 4 connected therewith and controlling each of the home appliances 2 and 3 in response to an associated external home appliance control signal.

Each of the home appliances 2 and 3, which are connected to a home network via the power line 1 and network line 4, includes a load 6 for operating the corresponding home appliance, such as a motor, a controller 7 for analyzing data inputted from the network line 4 and outputting a signal for control of the operation of the load 6 in accordance with the analyzed result a low voltage transformer (referred to hereinafter as "LVT") 8 for supplying a drive voltage to the controller 7, and a relay 9 for turning on/off the load 6 in response to the control signal from the controller 7.

A description will hereinafter be given of the operation of the conventional home network system with the above-mentioned construction.

The home server 5 is connected with an external communication network to control various home appliances in a home and exchange information therewith from time to time. The plurality of home appliances 2 and 3 are connected with the home server 5 via the network line 4 to exchange information therewith, and also to the power line 1 to receive the operating power therefrom.

In the case where a power plug (not shown) of each of the home appliances 2 and 3 is inserted into a receptacle (not shown), an alternating current (AC) voltage from the power plug is applied to the LVT 8 over the power line 1.

Upon receiving information or a control signal from the home server 5 over the network line 4, the controller 7 analyzes the received information or control signal and outputs a control signal in accordance with the analyzed result to control the load 6, such as the motor.

In response to the control signal from the controller 7, the relay 9 is turned on/off to turn on/off the load 6 so as to operate/stop the corresponding home appliance connected to the home network.

At this time, if the home appliance 2 or 3 is in operation, a considerable amount of power is continuously consumed therein. However, even when the home appliance 2 or 3 is in a standby mode where it is not in operation, the information exchange and monitoring must be performed between the home server 5 and the home appliance from time to time due to characteristics of the home network, thereby making it impossible to completely power off the home appliance.

In other words, the conventional home network system has a disadvantage in that a large amount of standby power, most of which is occupied by leakage current of the LVT 8, is consumed in the home appliance because the controller in the home appliance must always remain connected to the power line 1.

This problem has recently become a big issue in that many home appliances for the home network have been introduced to the market and the unplug campaign has become widespread due to a growing interest in power consumption reduction across all of society.

SUMMARY OF THE INVENTION

Therefore, the present invention has been made in view of the above problems, and it is an object of the present invention to provide a home network system with a standby power saving function and a method for saving standby power thereof, wherein various home appliances exchange information with a home server from time to time and, in a power standby mode, the supply of power to each of the home appliances is interrupted with the exception of a minimum amount of power necessary for a controller therein.

In accordance with one aspect of the present invention, the above and other objects can be accomplished by the provision of a home network system with a standby power saving function, comprising: at least one home appliance including a controller for analyzing data received over a network line and generating and outputting a home appliance control signal in accordance with the analyzed result, a low voltage transformer (LVT) for supplying a drive voltage to the controller, and power control means for controlling the supply of the drive voltage from the LVT to the controller according to whether the home appliance is in operation; and a home server for transmitting and receiving data to/from the home appliance over the network line.

In accordance with another aspect of the present invention, there is provided a method for saving standby power of a home network system, comprising the steps of: a), by a controller in a home appliance, determining whether the home appliance is in operation, the home appliance being adapted to transmit and receive data to/from a network line, the controller being adapted to analyze the data received by the home appliance and generate a home appliance control signal in accordance with the analyzed result; and b), if an external voltage is supplied to an LVT according to a result determined at the step a), supplying a drive voltage from the LVT to the controller and, if the external voltage is not supplied to the LVT according to the result determined at the step a), supplying to the controller a voltage charged when the external voltage is supplied to the controller.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
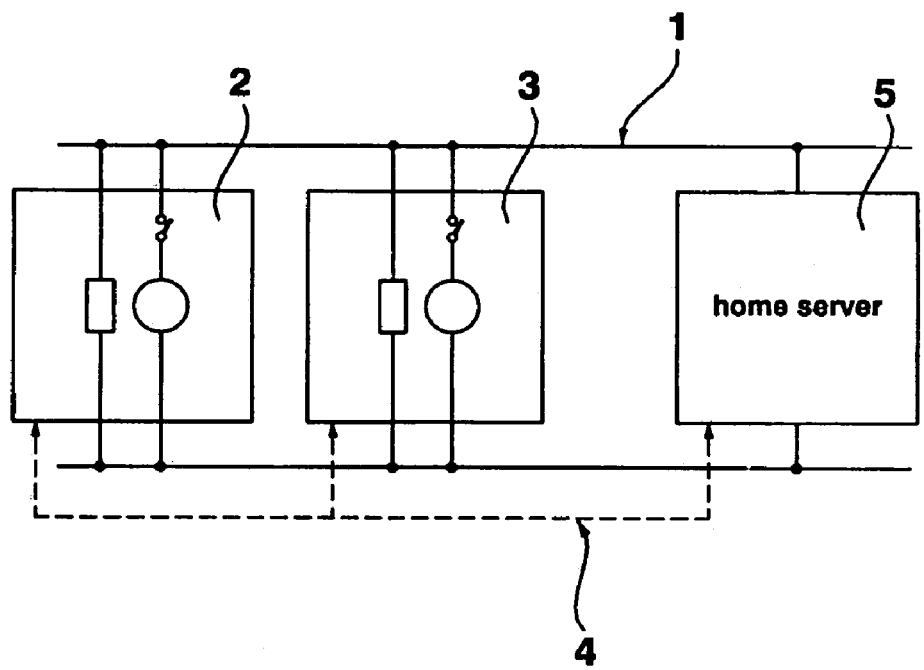
FIG. 1 is a block diagram showing the construction of a conventional home network system.
Figure 2:
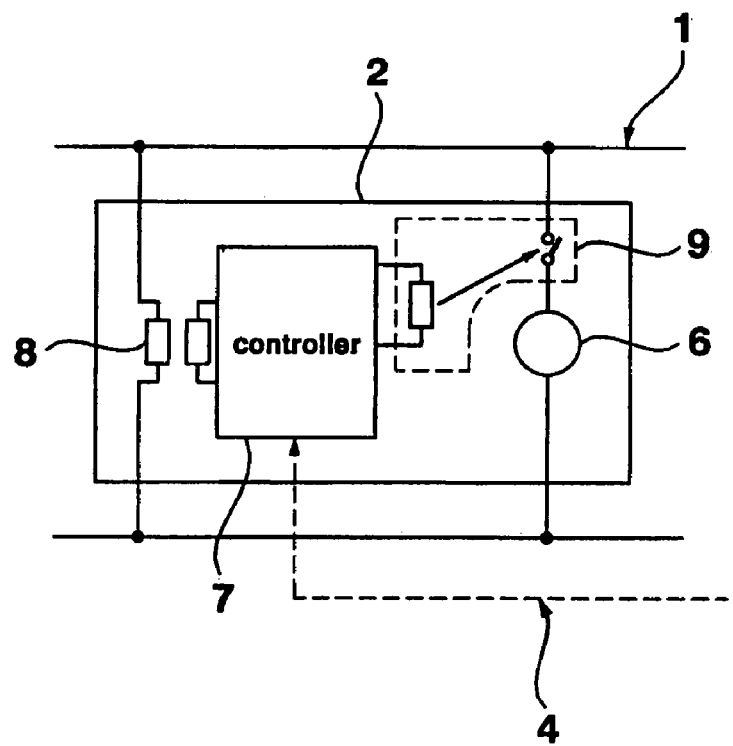
FIG. 2 is a block diagram showing the construction of each home appliance in the conventional home network system.
Figure 3:
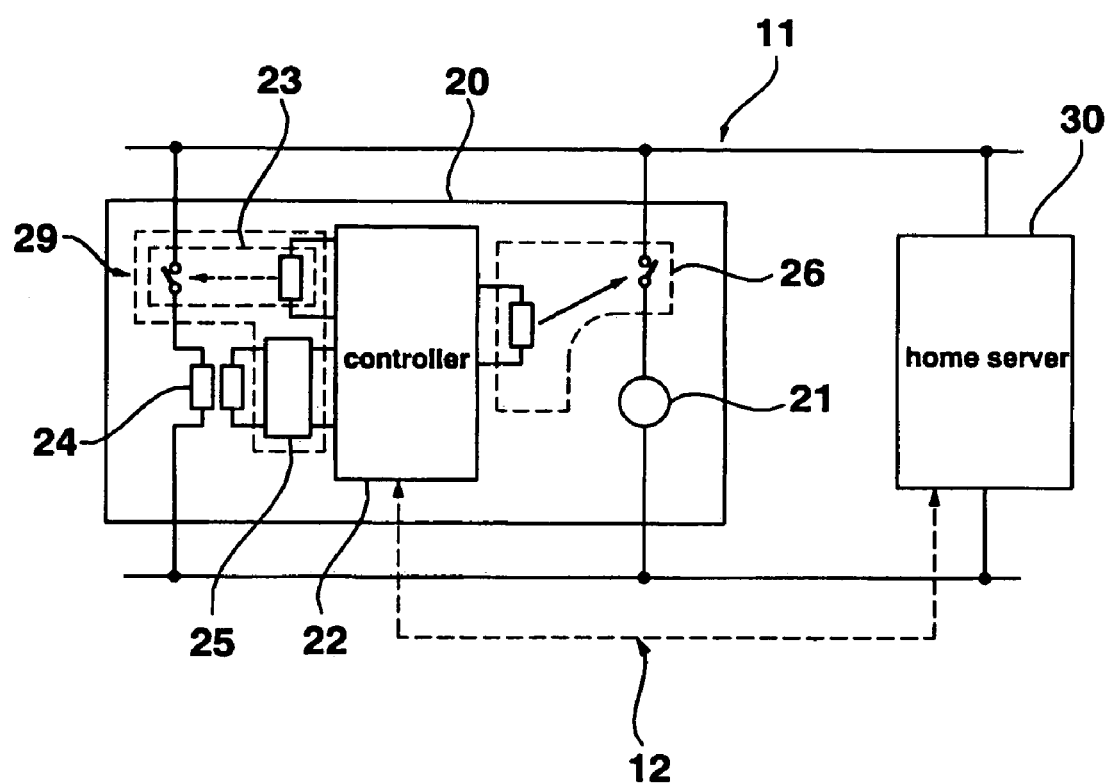
FIG. 3 is a block diagram showing the construction of a home network system with a standby power saving function in accordance with the present invention.

With reference to FIG. 3, there is shown in block form the construction of a home network system with a standby power saving function in accordance with the present invention. As shown in this drawing, the home network system comprises at least one home appliance 20 for a home network connected to a power line 11, which supplies operating power, and a home server 30 for exchanging information with the home appliance 20 over a network line 12 connected therewith and controlling the home appliance 20 in response to an external home appliance control signal.

The home appliance 20, which is connected to the home network via the power line 11 and network line 12, includes a load 21 for operating the home appliance, such as a motor, a controller 22 for analyzing data inputted from the network line 12 and outputting a signal for control of the operation of the load 21 in accordance with the analyzed result an LVT 24 for supplying a drive voltage to the controller 22, a load relay 26 for turning on/off the load 21 in response to the control signal from the controller 22, and a power control device 29 for controlling the supply of the drive voltage from the LVT 24 to the controller 22 according to whether the home appliance 20 is in operation.

The power control device 29 includes an LVT relay 23 disposed between the power line 11 and the LVT 24. The LVT relay 23 acts to prevent an external AC voltage from the power line 11 from being supplied to the LVT 24 when the home appliance 20 is in a standby mode, and supply the external voltage from the power line 11 to the LVT 24 when an operating command is sent from the network line 12.

The power control device 29 further includes a power supply unit 25 connected between the LVT 24 and the controller 22. The power supply unit 25 acts to selectively supply the drive voltage from the LVT 24 to the controller 22 in response to an on/off operation of the LVT relay 23.

Figure 4:
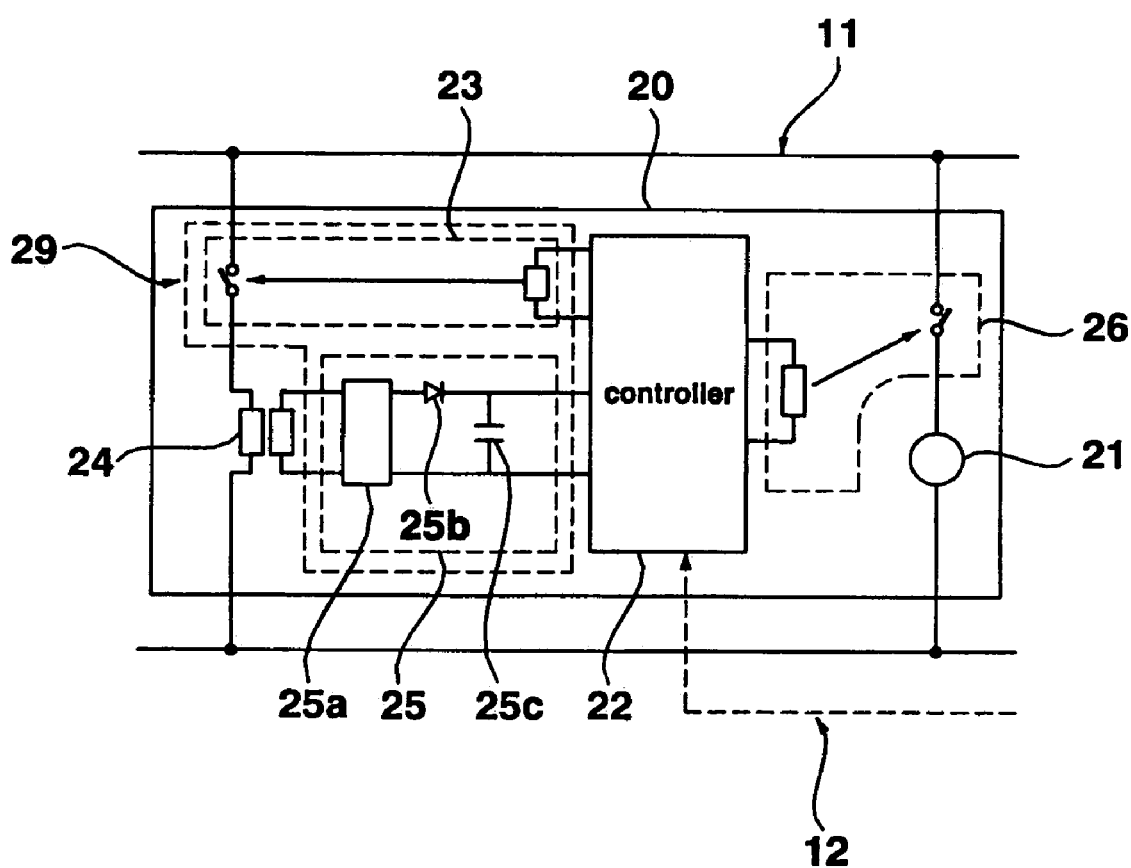
FIG. 4 is a block diagram showing the construction of a power control device of each home appliance in the home network system in accordance with the present invention.

FIG. 4 is a detailed block diagram of the power supply unit 25. As shown in this drawing, the power supply unit 25 includes a constant-voltage circuit 25a, which is a power supply circuit for supplying the drive voltage from the LVT 24 to the controller 22, a voltage regulating diode 25b, and a charger 25c. If the LVT relay 23 is turned off to interrupt the supply of the external voltage from the power line 11 to the LVT 24, a voltage charged on the charger 25c is applied to the controller 22.

At this time, the charger 25c supplies a minimum amount of power necessary for the information exchange of the controller 22 with the home server 30, thereby reducing leakage power resulting from the supply of the operating power from the power line 11 to the LVT 24.

If the LVT relay 23 is turned on, then it applies the external AC voltage from the power line 11 to the LVT 24, thereby making the voltage regulating diode 25b in the power supply unit 25 conduct to supply the drive voltage to the controller 22.

However, if the LVT relay 23 is turned off, then it blocks the external AC voltage from the power line 11, thereby causing no voltage to be applied to the LVT 24. As a result, the voltage regulating diode 25b in the power supply unit 25 does not conduct and the voltage charged on the charger 25c is supplied to the controller 22.

That is, by additionally installing the LVT relay 23 and the power supply unit 25 with the charger 25c in the home appliance 20 for the home network, when the home appliance 20 is in the standby mode, the supply of the external power is interrupted and only the minimum power necessary for the controller 22 is supplied, thereby making it possible to save standby power.

Figure 5:
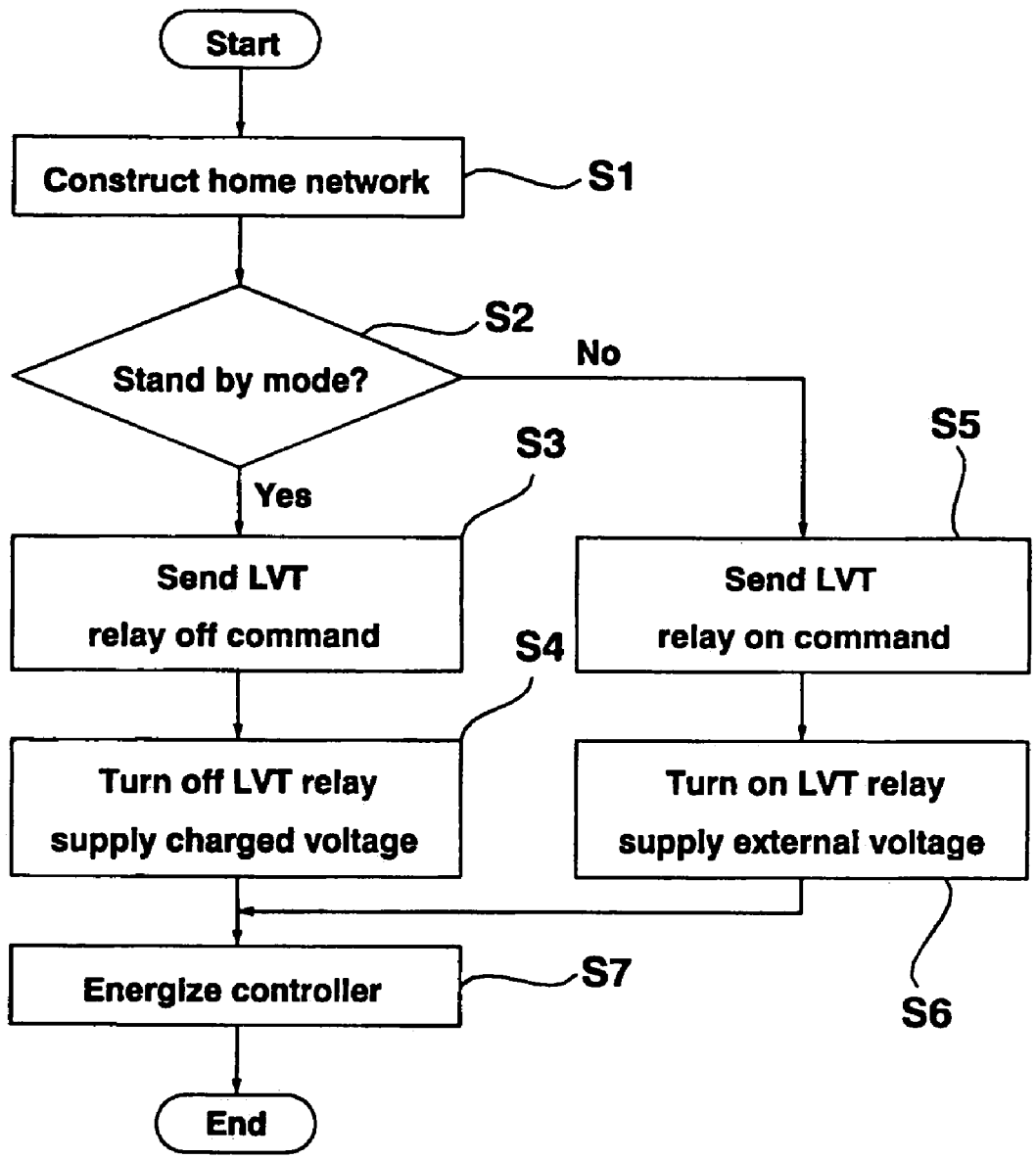
FIG. 5 is a flow chart illustrating a method for saving standby power of the home network system in accordance with the present invention.

The operation of the home network system with the standby power saving function according to the present invention, constructed as stated above, will hereinafter be described in detail with reference to a flow chart of FIG. 5.

First, the home server 30 is connected with an external communication network to control various home appliances in a home and exchange information therewith from time to time, and the at least one home appliance 20 for the home network is connected with the home server 30 via the network line 12 to exchange information therewith, and also to the power line 11 to receive the operating power therefrom (S1).

While continuously monitoring the home network constructed at the above step S1, the home server 30 determines whether the home appliance 20 is in the standby mode where the load 21 therein remains off (S2).

Upon determining at the above step S2 that the home appliance 20 is in the standby mode, the home server 30 sends an LVT relay off command to the controller 22 over the network line 12 to allow the home appliance 20 to enter a standby power state (S3).

The controller 22 processes the LVT relay off command sent at the above step S3 and outputs the processed command to the LVT relay 23 to turn it off. As the LVT relay 23 is turned off, it blocks the supply of the external voltage from the power line 11. At this time, the charger 25c in the power supply unit 25 supplies the voltage charged thereon to the controller 22 (S4).

At the above step S4, the charger 25c can supply the minimum power necessary for the controller 22, which is incapable of driving the load 21, but capable of monitoring the home network.

On the other hand, in the case where it is determined at the above step S2 that the home appliance 20 is not in the standby mode, the home server 30 sends an LVT relay on command to the controller 22 over the network line 12 (S5).

The controller 22 processes the LVT relay on command sent at the above step S5 and outputs the processed command to the LVT relay 23 to turn it on. As the LVT relay 23 conducts, it supplies the external voltage from the power line 11 to the controller 22 via the LVT 24 (S6).

The voltage supplied at the above step S6 is used to turn on the load relay 26 in response to a load drive command from the controller 22 to drive the load 21.

As a result, the controller 22 is energized with the voltage supplied at the above step S4 or S6 (S7).

As described above, according to the present invention, an LVT relay and a power supply unit with a charger are additionally installed in a conventional home appliance. As a result, when the home appliance is in a standby mode, the supply of external power is interrupted and only the minimum power necessary for a controller is supplied, thereby making it possible to save standby power.

As apparent from the above description, the present invention provides a home network system with a standby power saving function and a method for saving standby power thereof, wherein an LVT relay and a power supply unit with a charger are additionally installed in a home appliance, so that, when the home appliance is in a standby mode, the supply of external power is interrupted and only the minimum power necessary for a controller is supplied, thereby making it possible to save the same amount of standby power as that of LVT leakage power.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A home network system with a standby power saving function, comprising:
   at least one home appliance including a controller for analyzing data received over a network line and generating and outputting a home appliance control signal in accordance with the analyzed result, a low voltage transformer (LVT) for supplying a drive voltage to said controller, and power control means for controlling the supply of the drive voltage from said LVT to said controller according to whether said home appliance is in operation; and
   a home server for transmitting and receiving data to/from said home appliance over said network line,
   wherein said power control means includes:
   an LVT relay turned on/off for supplying or blocking an external voltage from a main power line to said LVT according to whether said home appliance is in operation, said LVT relay being disposed directly between the main power line and the LVT; and
   power supply means connected between said LVT and said controller for supplying said drive voltage from said LVT or a charged voltage to said controller, said power supply means being disposed directly between the LVT and the controller.

2. The home network system as set forth in claim 1, wherein said home appliance further includes load means for operating/stopping said home appliance in response to said home appliance control signal from said controller.

3. The home network system as set forth in claim 2, wherein said load means includes:
   a load relay turned on/off in response to said home appliance control signal from said controller; and
   a motor driven/stopped in response to the turning-on/off of said load relay for operating/stopping said home appliance.

4. The home network system as set forth in claim 1, wherein said power supply means includes a charger for performing a charging operation when said external voltage is supplied to said LVT and supplying said charged voltage to said controller when said external voltage is not supplied to said LVT such that the supplied charged voltage corresponds to a minimum amount of power necessary for information exchange of the controller with the home server.

5. The home network system as set forth in claim 4, wherein said power supply means further includes:
   a power supply circuit for supplying said drive voltage from said LVT to said controller when said external voltage is supplied to said LVT; and
   a diode connected between said power supply circuit and said controller for preventing a reverse voltage from being applied from said power supply circuit to said controller.

6. The home network system as set forth in claim 1, wherein:
   said home server is adapted to determine whether said home appliance is in operation and send a home appliance operation/nonoperation indication signal to said controller in accordance with the determined result; and
   said controller is adapted to control the turning-on/off of said LVT relay in response to said home appliance operation/nonoperation indication signal from said home server such that said external voltage is supplied or blocked to said LVT according to whether said home appliance is in operation.

7. A method for controlling power of a home network system, said method comprising:
   analyzing, via a controller included in a home appliance, data received over a network line from a home server to determine if the home appliance is to be in an operation mode or a standby mode;
   supplying, via a low voltage transformer (LVT), a drive voltage to said controller based on whether the controller determines the home appliance is to be in the operation mode or in the standby mode; and
   controlling, via a power control device, the supplying of the drive voltage from said LVT to said controller according to whether the controller determines said home appliance is to be in the operation mode or in the standby mode,
   wherein said controlling step further includes:
   turning on and off an LVT relay to supply or block an external voltage from a main power line to the LVT according to whether the controller determines said home appliance is to be in the operation mode or in the standby mode, said LVT relay being disposed directly between the main power line and the LVT; and
   supplying, via a power supply device connected between said LVT and said controller, said drive voltage from said LVT to the controller or supplying a charged voltage to the controller according to whether the controller determines said home appliance is to be in the operation mode or in the standby mode, said power supply device being disposed directly between the LVT and the controller.

8. The method as set forth in claim 7, further comprising:
   operating/stopping, by a load device, the home appliance in response to the analyzing step by the controller.

9. The method as set forth in claim 8, wherein said operating/stopping step further includes:
   turning on and off a load relay in response to the analyzing step by the controller; and
   driving or stopping a motor in response to the turning on and off of the load relay.

10. The method as set forth in claim 7, wherein said power supply device includes a charger configured to perform a charging operation when said external voltage is supplied to said LVT and to supply said charged voltage to said controller when said external voltage is not supplied to said LVT such that the supplied charged voltage corresponds to a minimum amount of power necessary for information exchange of the controller with the home server.

11. The method as set forth in claim 10, wherein said power supply device further includes:
   a power supply circuit configured to supply said drive voltage from said LVT to said controller when said external voltage is supplied to said LVT; and
   a diode connected between said power supply circuit and said controller and configured to prevent a reverse voltage from being applied from the power supply circuit to said controller.

12. The method as set forth in claim 7, further comprising:
   determining, by said home server, whether said home appliance is in operation and sending a home appliance operation/nonoperation indication signal to said controller in accordance with the determined result; and
   controlling, via said controller, the turning on and off of said LVT relay in response to said home appliance operation/nonoperation indication signal from said home server such that said external voltage is supplied or blocked to said LVT according to whether said home appliance is in operation.

13. A home network system with a standby power saving function, comprising:
   at least one home appliance; and
   a home server connected to said at least one home appliance over a network line and configured to transmit and receive data to and from said home appliance,
   wherein the at least one home appliance includes:
   a controller configured to analyze data received over the network line and to output a home appliance control signal in accordance with the analyzed result;
   a low voltage transformer configured to supply a drive voltage to the controller;
   an LVT relay configured to be turned on and off to thereby supply or block an external voltage from a main power line to said LVT according to whether said home appliance is in operation, said LVT relay being disposed directly between the main power line and the LVT;
   a power supply circuit connected between said LVT and said controller and configured to supply said drive voltage from said LVT or a charged voltage to said controller, said power supply means being disposed directly between the LVT and the controller.

14. The home network system as set forth in claim 13, wherein said home appliance further includes a load circuit configured to operate said home appliance in response to said home appliance control signal from said controller.

15. The home network system as set forth in claim 14, wherein said load includes:
   a load relay configured to be turned on and off in response to said home appliance control signal from said controller; and
   a motor configured to be driven and stopped in response to the turning on and off of said load relay for operating said home appliance.

16. The home network system as set forth in claim 13, wherein said power supply circuit includes a charger configured to be charged when said external voltage is supplied to said LVT and to supply said charged voltage to said controller when said external voltage is not supplied to said LVT such that the supplied charged voltage corresponds to a minimum amount of power necessary for information exchange of the controller with the home server.

17. The home network system as set forth in claim 16, wherein said power supply circuit further includes:
   a constant voltage circuit configured to supply said voltage from said LVT to said controller when said external voltage is supplied to said LVT; and
   a diode connected between said constant voltage circuit and said controller and configured to prevent a reverse voltage from being applied from said constant voltage circuit to said controller.

18. The home network system as set forth in claim 13, wherein:
   said home server is configured to determine whether said home appliance is in operation and send a home appliance operation/nonoperation indication signal to said controller in accordance with the determined result; and
   said controller is configured to control the turning-on/off of said LVT relay in response to said home appliance operation/nonoperation indication signal from said home server such that said external voltage is supplied or blocked to said LVT according to whether said home appliance is in operation.

* * * * *